No. 833,430. PATENTED OCT. 16, 1906.
C. M. VERRILL.
FISHING REEL.
APPLICATION FILED FEB. 12, 1906.

Witnesses. Inventor:
Calvin M. Verrill
By Geo. H. Strong Atty.

UNITED STATES PATENT OFFICE.

CALVIN M. VERRILL, OF OAKLAND, CALIFORNIA.

FISHING-REEL.

No. 833,430.  Specification of Letters Patent.  Patented Oct. 16, 1906.

Application filed February 12, 1906. Serial No. 300,638.

*To all whom it may concern:*

Be it known that I, CALVIN M. VERRILL, a citizen of the United States, residing at Oakland, in the county of Alameda and State of California, have invented new and useful Improvements in Fishing-Reels, of which the following is a specification.

My invention relates to improvements in fishing-reels.

It consists in a combination of parts for regulating the tension upon the line for engaging and disengaging the crank from the reel and for other purposes.

It also consists in details of construction which will be more fully explained by reference to the accompanying drawings, in which—

Figure 1:
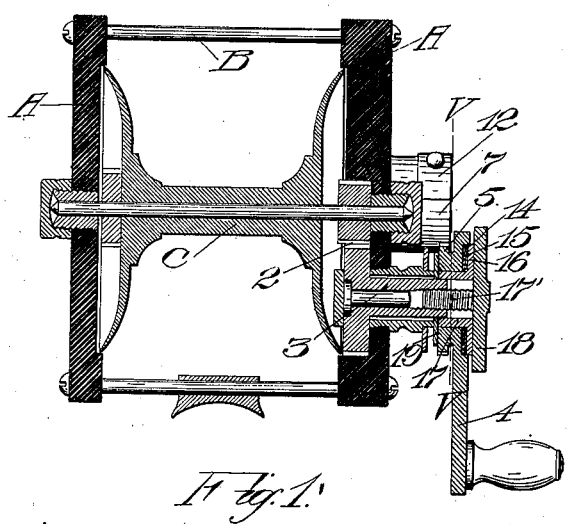
Figure 2:
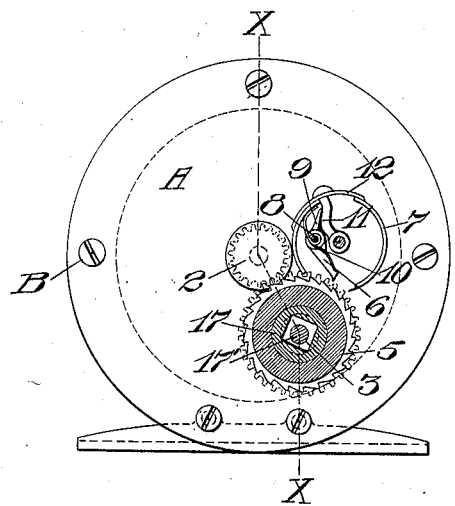

Figure 1 is a section on line $x$ $x$ of Fig. 2, showing the reel attachment. Fig. 2 is a section on line $v$ $v$ of Fig. 1.

The frame consists of the usual or any suitable heads A, connected by intermediate bars B and having a centrally-journaled drum C, upon which the line is coiled. By means of gears 2 the shaft of the drum C is connected with the journaled crank-shaft 3, to which the crank 4 is attached, as hereinafter described. The center or hub of the crank has a circular hole made through it turnable upon a disk, the hub of which fits the polygonal end of the shaft 3. Fixed to the inner face of the crank-disk is a ratchet-wheel 5, and this ratchet-wheel may be engaged with or disengaged from a pawl 6, which is here shown as carried in a casing 7, secured to the reel-disk A at one side of the crank-shaft. This pawl is pivoted upon a pin, as at 8, and has an extension-arm 9 upon the opposite side of the pin from the pawl-point. A spring 10, surrounding the pivot-pin of the pawl, presses upon the latter and normally holds it in engagement with the ratchet. When it is desired to disengage the pawl to allow the reel to turn independent of the crank, it is effected by means of an arm 11, turnable upon a pivot centrally located within the pawl-case and so constructed as to engage the projecting end 9 of the pawl.

The outer end of the lever-arm is connected with a segmental slide 12, movable upon the outside of the pawl-casing, the lever-arm projecting through a slot in the casing, so as to connect with the slide. A button or projection upon the slide serves to move it so that when moved in one direction it presses against the extension 9 and lifts the pawl free from the ratchet, and the shaft is thus free to turn independently. By moving the slide in the opposite direction the pawl is released, and the spring 10 acts to throw it into contact with the ratchet. Then the turning of the crank-shaft in one direction will be prevented, and it will be free to turn in the other direction.

In order to regulate the tension, I have shown the central disk of the crank-shaft having a depression formed in it, as shown at 14. Within this depression is placed a piece of canvas 15 or like fabric having some elasticity and sufficient frictional resistance. Outside of the canvas is a disk 16, corresponding in size with it and the depression 14, and when fitted therein it serves as a follower, which may be advanced or retracted to increase or decrease the compression and frictional resistance. This disk 16 has a hub 17, which projects so as to fit in an enlarged opening in the center of the crank, and the interior of this hub is provided with the polygonal opening, which, as previously described, fits the polygonal end of the crank-shaft, with which it is turnable independently of the crank and ratchet.

Upon the polygonal shaft is a disk 19, and the crank-disk may be compressed between the disks 16 and 19 by means of a screw 17', having a large head 18, and threaded to fit into the center of the end of the crank-shaft and being turned by means of its head it forces the disk 16 into more or less compressive contact with the fibrous or elastic disk within the depression of the crank-hub, thus compressing the crank-hub between the inner and outer disks 16 and 19. By turning the head and screw backward the pressure will be relieved, so that the reel may run freely, as in casting, and without turning the crank, which is held stationary by the pawl and ratchet. As soon as the fish is struck or the cast is complete the milled head may be turned, so that any amount of frictional contact may be obtained between the disks, and thus by holding the crank stationary this friction controls the running out of the line from the reel.

Having thus described my invention, what I claim, and desire to secure by Letters Patent, is—

1. In a fishing-reel, the combination of a revoluble winding drum or spool, a crank by which motion is transmitted to coil the line, opposing frictional members between which the crank is located, a ratchet-wheel turnable with the crank, a pawl to engage and disengage the ratchet-wheel whereby the spool may turn with, or independently of, the crank, and means whereby variable resistance to the unwinding of the line may be applied.

2. The combination in a fishing-reel of a journaled line-carrying drum, a shaft having connection with the shaft of the winding-drum, a crank connected with said shaft to wind the line, a ratchet and a pawl to prevent the turning of the crank in one direction, compression-disks between which the crank is turnable, and an adjusting-head whereby variable resistance to the unwinding of the line may be applied.

3. In a fishing-reel, a revoluble line-carrying drum, a crank-shaft and connections by which motion is transmitted to wind the line, a ratchet turnable loosely with the crank upon its shaft, a pawl engaging the ratchet to prevent the crank from turning backward, and adjustable compression devices to regulate tension upon the line.

4. In a fishing-reel, a revoluble line-carrying shaft, a counter-shaft through which motion is transmitted to turn the line-shaft, said counter-shaft having a frictional disk fixed to its outer end, a second disk engaging and turnable with the counter-shaft, a crank having its axial portion fitting between the disks and turnable independently thereof, means to prevent the crank from turning backward, and means for variably compressing the crank between the disks.

5. In a fishing-reel, a revoluble line-carrying shaft, a counter-shaft through which motion is transmitted to revolve the line-shaft, said counter-shaft having a frictional disk upon its outer end, a second disk with a hub engaging and turning with the counter-shaft, a crank turnable upon the hub, means for compressing the crank between the disks, a ratchet carried by and turnable with the crank, a pawl pivoted with relation to the ratchet, and means for engaging and disengaging it with the ratchet.

6. In a fishing-reel, a line-winding shaft, a counter-shaft, a crank, and frictional means for connecting it with and releasing it from the counter-shaft, a ratchet turnable with the crank, a spring-pressed pawl engaging the ratchet, and having an end extending beyond its pivot, an inclosing case, a centrally-pivoted arm adapted to press the pawl and disengage it from the ratchet, and a segment carried by the arm and movable over the exterior of the case.

In testimony whereof I have hereunto set my hand in presence of two subscribing witnesses.

CALVIN M. VERRILL.

Witnesses:
S. H. NOURSE,
HENRY P. TRICOU.